Oct. 10, 1950   V. W. GREEN   2,525,219
VEHICLE WHEEL
Filed June 29, 1946   3 Sheets-Sheet 1
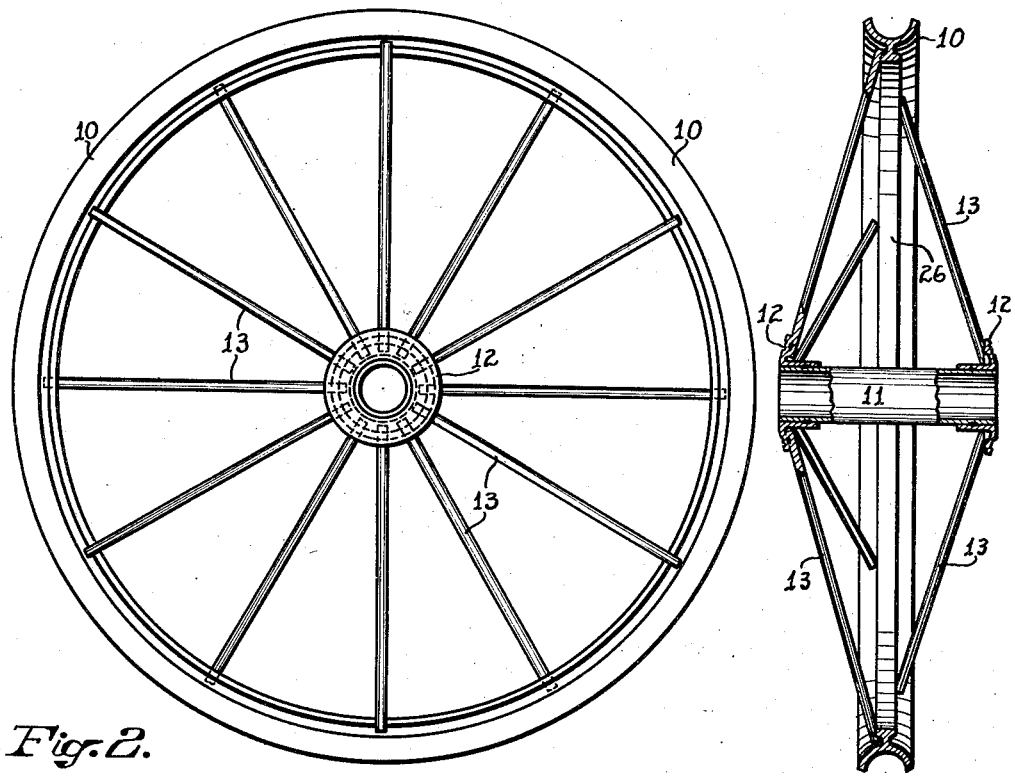
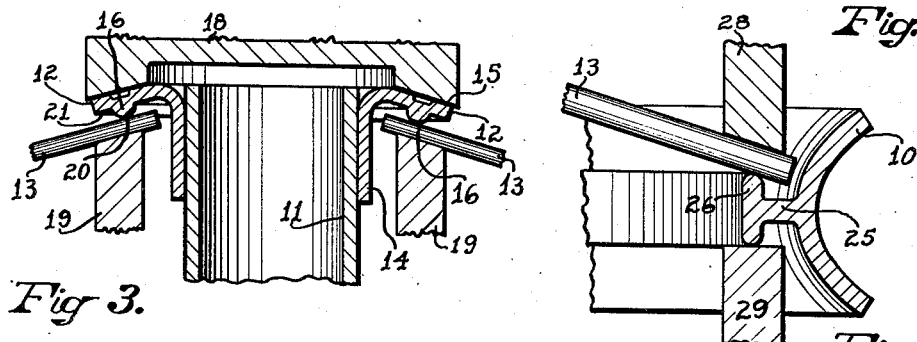
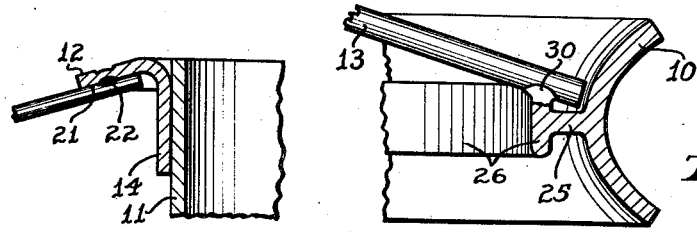
Witness
Herbert E. Covey
Inventor
V. Wayne Green
By Clayton R. Jenks
Attorney Oct. 10, 1950 V. W. GREEN 2,525,219
VEHICLE WHEEL
Filed June 29, 1946 3 Sheets-Sheet 2
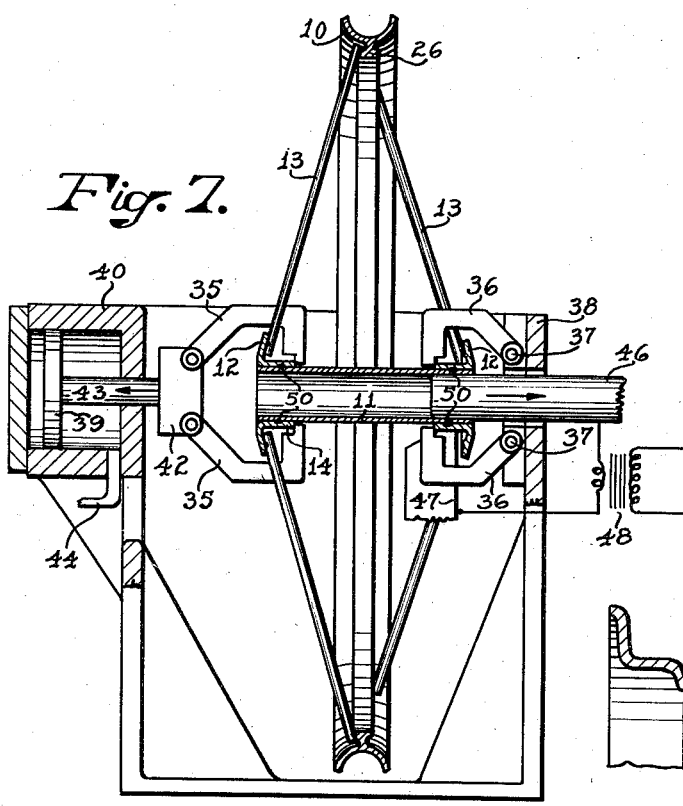
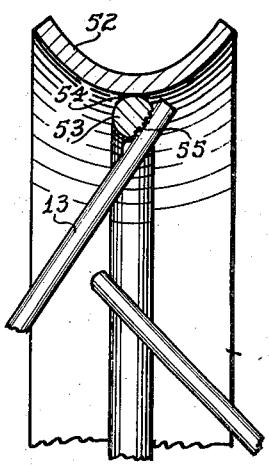
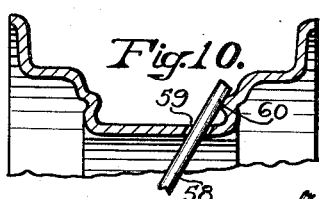
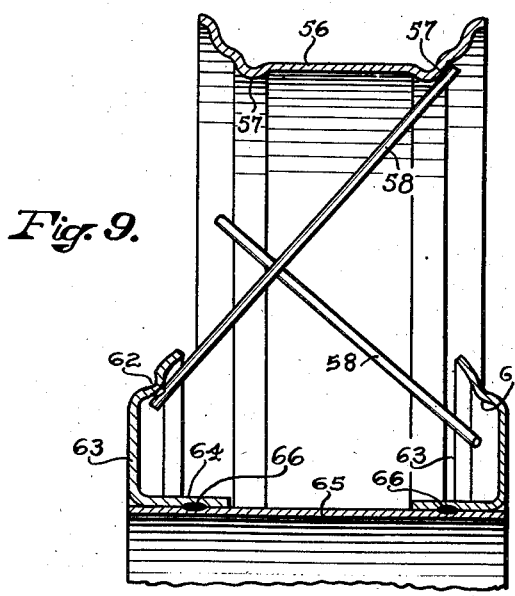
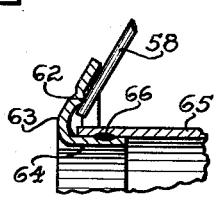
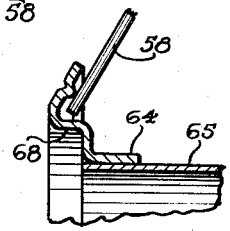
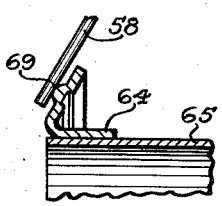
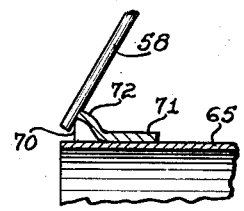
Inventor
V. Wayne Green
Witness
Herbert E. Covey
By Clayton L. Jenks
Attorney Oct. 10, 1950   V. W. GREEN   2,525,219
VEHICLE WHEEL Filed June 29, 1946   3 Sheets-Sheet 3

Inventor
V. Wayne Green
By Clayton L. Jenks
Attorney

Witness
Herbert E. Covey

Patented Oct. 10, 1950

2,525,219

UNITED STATES PATENT OFFICE 2,525,219

VEHICLE WHEEL

Vernor Wayne Green, Shrewsbury, Mass.

Application June 29, 1946, Serial No. 680,468

3 Claims. (Cl. 301—58)

This invention relates to vehicle wheels and more particularly to wheels having metal rims and hubs connected by wire or rod spokes.

A standard type of wire wheel for use on baby carriages and the like is made in a series of manual and mechanical operations which have proven to be both expensive and laborious as well as requiring a great deal of manual skill. For example, one type of wheel is made by clamping U-shaped wire spokes between a pair of hub flanges at each end of the hub, one of the pair of flanges being a round disk and the other star shaped with its pointed ends crimped over the loops of the spokes and the edge of the disk. The two sets of spokes and their pair of flanges are assembled on a cylindical hub provided with dimples to locate the flanges endwise. Then the free ends of the spokes are inserted through previously punched holes in a metal rim, and the heads of the spokes are riveted to the rim by a succession of operations in which one spoke at a time is gripped between clamps and held in place while the riveted head is formed. This method is wasteful, slow, tedious and laborious, and it requires a multiplicity of skilled operations in order to prevent serious warpage or distortion of the wheel. Due to an uneven length of spoke or other variations in structure and assembly, it is problematical whether any tension is obtained in the spokes or only a part of them are under tension; and the hub may be drawn into an eccentric location or the rim warped so that it will not run true.

Various types of metal spoke wheels have been proposed heretofore in which the spokes have been secured to the rim and/or hub by welding operations, but they have had inherent disadvantages that prevented the attainment of an automatically equalized tension, or they have been complicated in structure and have required laborious and expensive skill in their manufacture. One of the major problems is that of welding the spokes in place and yet providing the tension that is needed in a wheel having the load supported wholly by spokes in suspension. It is important that the spokes have the same effective lengths and be under an equalized tension which is adequate to bear the load but does not impose severe stresses on the spokes or the wheel rim.

One primary object of this invention is to provide a metal wheel having the spokes secured to the hub and rim under an equalized tension.

A further primary object is to provide a method of making such a wheel by a welding procedure which results in equalized tension.

Another object is to make a wire spoke wheel by a method which permits welding the spokes in place on both the rim and hub parts while under no material tension and thereafter imparting the required tension thereto.

Another object of my invention is to provide a vehicle wheel of this type and a method of making the same by a simplified and comparatively inexpensive procedure which eliminates many mechanical operations of manufacture and wherein the spokes are rigidly welded to both the rim and hub in an integral wheel structure which will give a long life of useful service.

A further object is to provide a method of manufacturing such a wheel in which the spokes are integrally secured to a hub part and the rim with an attainment of equal effective lengths irrespective of the initial length of each spoke.

Another object is to provide a vehicle wheel and a method of making the same in which the various parts are secured together by resistance projection welding and wherein various operations may be performed simultaneously and under conditions which do not distort the wheel or set up uneven stresses.

Another object of the invention is to provide a method wherein the spokes may be assembled and welded to both the rim and hub flanges and the spoke lengths are automatically determined during the welding operation, and wherein the spokes are placed under adequate and substantially equal tension without distorting the wheel structure. Further objects will be apparent in the following disclosure.

In accordance with my invention, I propose to manufacture a metal vehicle wheel having rod or wire spokes by a procedure employing resistance projection welding for connecting the spokes to both the rim and to the hub flanges, after which the flanges are spread apart to place the spokes under the required tension and then welded in place on the hub.

Referring to the drawings which illustrate various embodiments of this invention:

Fig. 1 is a vertical section through one form of wheel that is suitable for baby carriages and carts;

Fig. 2 is a side elevation of the same;

Fig. 3 shows the method of assembly and welding the inner ends of the spokes to a hub flange;

Fig. 4 is a fragmentary sectional view of a welded spoke and flange assembled freely on a hub;

Fig. 5 is a fragmentary sectional view showing the manner of welding the outer ends of the spokes to the wheel rim;

Fig. 6 shows a fragmentary detail of the welded spoke and rim;

Fig. 7 shows diagrammatically the manner of placing the assembled and welded spokes with their associated flanges under tension and then welding the flanges to the wheel hub as a final assembling operation;

Fig. 8 is an enlarged detail of a composite rim construction in which a wire is welded to the inner periphery of a rim section, this wire becoming the member to which the spokes are resistance projection welded;

Fig. 9 is a detail showing a modified form of wheel that is suitable for an automobile or for other heavy duty purposes in which the spokes are arranged in a criss-cross pattern having sets of spokes welded in alternate arrangement to the rim and an inside projecting surface of the hub flange;

Fig. 10 shows a detail in which the spoke passes through a hole in the rim and is welded to an inner projecting surface thereof;

Fig. 11 shows a construction in which the hub flange is mounted inside the hub instead of outside, as shown in Fig. 9;

Figure 15:
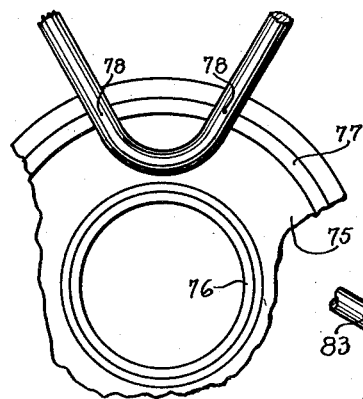
Figure 16:
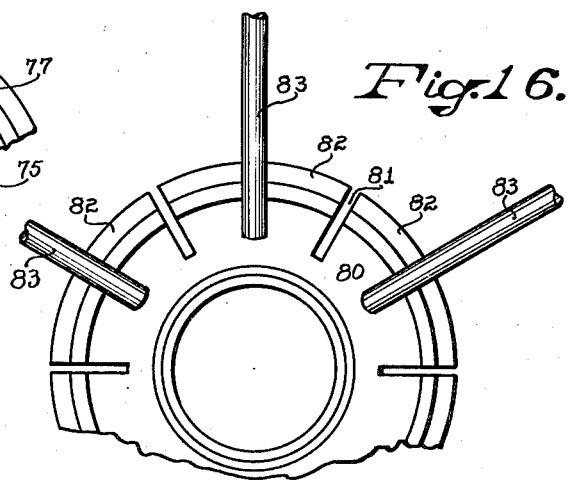
Figure 17:
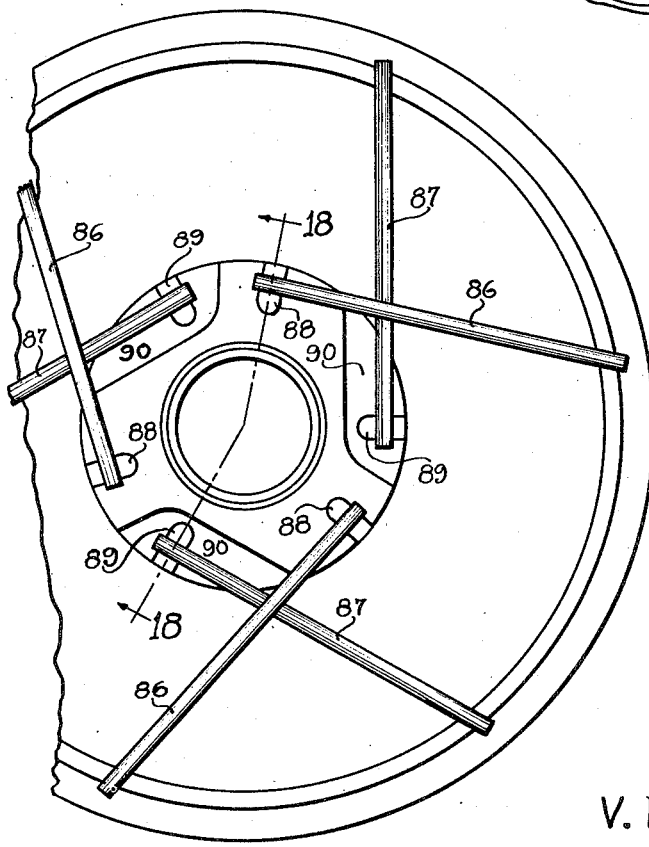
Figure 18:
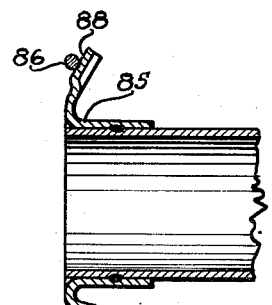

Fig. 12 has a hub flange of different shape that is adapted to provide a raceway for ball bearings;

Fig. 13 shows the hub flange assembled on the outside of the hub and the spoke on a bead on the outside of the flange;

Fig. 14 is a detail showing the spoke connected to an end surface of the flange;

Fig. 15 shows how a U-shaped spoke may be connected to the hub flange;

Fig. 16 shows a slotted flange structure;

Fig. 17 shows a wheel of the tangent spoke type, partly broken away, in which the spokes mounted in a cross pattern are secured to raised and depressed parts of the hub flange so located that the spokes are not bent at the point of crossing; and Fig. 18 is a sectional detail taken on the line 18—18 of Fig. 17.

The preferred forms of wheels of this type are made by a procedure which includes various resistance projection welding operations. The simplest form of a resistance projection weld is made by two crossed round wires, known in the trade as "cross wire welding," wherein the area of weld is determined not by the size or area of the electrode but by the diameter of the wire itself. When heated electrically under pressure, the two wires embed in each other and form an integral interfusion. In welding a round wire to a flat sheet, it is desirable to so form the sheet at its juncture with the wire that it will resemble in part the cylindrical contour and volume of the wire, thus reproducing approximately the conditions found when welding two crossed wires. If a round wire were welded against the undisturbed flat face of a plate, such as the hub flange, the wire would tend to overheat and be mashed down before the plate has reached a fusing temperature, due to inequality of volume and the respective locations of the parts in relation to each other and to the welding electrodes. In the plate, cold metal surrounds the area being heated and supports the heated section against the forging force applied by the welding electrodes; whereas in the round wire, the entire wire section becomes hotter than the plate and there is no cold metal around the periphery to support and sustain the heated section during application of the high forging force imparted by the electrodes. Hence, the wire mashes down without interfusing adequately with the plate.

I propose to secure the spokes to the rim and the hub by this resistance projection weld procedure, and this is done preferably by first welding all of the spokes to two hub flanges, or to the rim, if preferred, and then welding the other ends of the spokes in place, but while the hub ends of the spokes are located inwardly of their final positions and under no material tension; after which the hub ends of the spokes are forced apart to apply tension thereto substantially equally and simultaneously and then secured in place. To this end, the inner ends of the spokes may be secured to two hub parts adapted to be secured together in the final welding operation, or preferably to two spaced flanges which are subsequently secured on a hub tube in the tensioning locations. This is preferably accomplished by assembling and welding alternate spokes to each of two hub flanges and then to the rim while the spokes are held freely in place and under no tensional stresses and thereafter forcibly spacing the flanges and tensioning the spokes and fixing the flanges in such spaced locations.

Referring first to Figs. 1 to 6 inclusive, a wheel made in accordance with this invention comprises a rim 10 of suitable shape, a hub tube 11, two spaced hub flanges 12 and the spokes 13 which are held together only by projection weld joints. In the preferred practice of this invention, alternate spokes 13 are all welded first to lateral projections on the two flanges 12 and thereafter all of the spokes are welded at their other ends to lateral projections on the rim. The two hub flanges may be of various shapes. As shown particularly in Figs. 3 and 4, such a flange may comprise a cylindrical or tubular portion 14 and a substantially radially projecting annular plate 15. The spoke may be a round steel rod or wire or stamped, cut or die formed metal of any suitable shape. In order to provide a bead 16 on the flat sided flange for projection welding, I may shape the flange suitably, as by means of a punch used in connection with a die to flow some of the flange metal outwardly to form a laterally projecting cylindrical or part spherical bead or weld projection 16 which will make substantially a point contact with the cylindrical rod 13, as indicated at 20 in Fig. 3. If the spoke has a flat surface at the weld joint, it may likewise be suitably shaped to provide a projection extending crosswise of the flange projection. Then, as a first step in the welding assembly, I may mount the flange 12, whether or not the hub tube 11 is in place, in a welding machine in association with two electrodes 18 and 19 and with all of the spokes 13 radially assembled in substantially their final positions relative to the flange plate. The plate portion 15 of the hub flange is preferably shaped as a frustrum of a cone having its weld surface extending in substantially the radial direction of the spoke. Then upon applying pressure to the two electrodes substantially parallel to the axis of the wheel and passing a suitable electric current, the point contact 20 of each hub flange projection and the spoke becomes heated and the parts are forced into each other and preferably until the spoke and bead 16 have flowed sufficiently to permit the spoke to lie in contact with the under surface 21 of the flange. The resultant weld bead 22 (Fig. 4) thus makes the two parts integral. All of one set of the alternate spokes may be welded on one flange simultaneously, and this operation may be duplicated either at the same time or later for the other hub flange and its spokes. The outer free ends of the two sets of spokes are welded to the wheel rim 10 by a similar operation in a suitable resistance welding machine. All of the spokes may be welded to the rim simultaneously or serially around the rim or as desired. Also, it is feasible to weld all of the spokes at both ends at the same time in any desired alternate arrangement.

The wheel rim may be suitably shaped, such as shown in the various figures, but in each case I preferably provide a weld projection surface adapted to give substantially a point contact with the cylindrical surface of the spoke 13. In the form shown in Figs. 5 and 6, the rim 10 may have an I-beam structure formed of a central radial rib 25, a concave outer rim portion 10 and an inner laterally projecting flange portion 26. This flange 26 is preferably provided with continuous or spaced rounded corners which make a point contact with the spoke 13, as shown in Fig. 5. Then when the electrodes 28 and 29 (Fig. 5) are applied under pressure to heat the parts and force them together, the weld 30 is formed as shown in Fig. 6, in which the flange 26 of the rim and the spoke become interfused at their junction.

An important aspect of this invention lies in the fact that the spokes 13 do not have to be cut to exactly the same length, provided they are longer than the distance between the associated weld projections of the rim and hub and not so long as to butt at their ends under pressure against the inner surface of the concave rim 10; and the rib 25 of the wheel rim is long enough so that the point of weld between the spoke and the flange 26 may vary materially. As shown in the drawings, the spokes are connected to the hub flange at any suitable location and then to the rim flange at the point of contact where they normally rest against each other; and any endwise or longitudinal dislocation of a spoke, provided it is long enough, does not effect the wheel structure at all. It of course is desirable that the spoke be cut almost long enough so that it will come fairly close to both the cylindrical part 14 of the hub flange and the outer convex face of the rim 10, and thus make a neat looking job. Various expedients may be adopted in connection with this structure to satisfy the artistic tastes of the manufacturer and user of the wheel.

Insofar as described, the alternate spokes are now integrally welded to the two freely movable radial flanges 12 of the hub and to the rib 26 of the I-beam shaped wheel rim. The next step in the manufacture of this wheel is illustrated diagrammatically in Fig. 7, which involves spreading the flanges apart to tension all of the spokes simultaneously and substantially equally and then securing them permanently in position. If the hub tubes 14 (Fig. 4) are long enough and of diameters suitable for telescoping, they may be moved axially and secured together. Or, the flange plates 15 may be separate from an intermediate hub tube, but I prefer to make the parts as shown in which a central hub tube 11 telescopes with the flange tubes 14. In that case, the separate hub tube 11 is introduced into the two wheel flanges, if not previously assembled, and the wheel is then mounted in a welding machine arranged to force the spaced wheel flange plates 15 axially away from one another and put the spokes under tension. Various constructional units may be employed for the purpose.

As illustrated, a pair of clamps 35 are shaped to grip against the inner radial face of the hub flange tube 14 at the left hand side of the machine, and another pair of clamps 36 similarly engages the inner radial face of the hub flange at the right hand side of the machine. The clamps 36 are pivotally mounted at 37 on the framework 38 and thus are arranged to resist the pull of the other pair of clamps 35, which are mounted to be moved by a piston 39 within a suitable fluid pressure cylinder 40 which is operated by air or liquid under a required pressure. The two clamps 35 are pivotally connected to a block 42 which in turn is mounted on the piston rod 43 attached to the piston. The admission of a controlled fluid pressure through the pipe 44 thus forces the clamps 35 toward the left and spreads the two hub flanges 12 apart. The tension thus imposed on the spokes will of course depend upon the size and structural characteristics of the wheel. Ordinarily the parts are so accurately made and assembled that a movement of only a few thousandths of an inch is required to impose the necessary tension on the wheel spokes. If the wheel rim 10 has been previously made in circular form and the spokes 13 are welded in proper locations on the wheel rim to give the same effective length for each spoke, as may be effected by mounting the hub flanges and the rim in a suitable centering jig prior to welding the spokes to the rim, then tension on the spokes is even and the wheel structure is not warped or distorted. When the proper tension has been thus applied to the spokes by drawing the wheel flanges apart, the hub flanges are welded or otherwise affixed to the hub and thus secured rigidly in position. This is preferably accomplished by welding the two flange tubes 14 to the hub tube 11.

The hub welding operation is illustrated diagrammatically at the right hand side only of the machine in Fig. 7, but both of the hub flanges may be welded in place at the same time. The welding mechanism is illustrated as comprising an electrode 46 projecting into and contacting firmly with the inside surface of the cylindrical hub 11, and a further set of electrodes 47 may be arranged radially between the spokes, only one electrode 47 being illustrated. Suitable mechanism is incorporated in the machine to apply the required pressure from the outside to the inside electrode. Electric power is applied to the electrodes through a suitable transformer 48, and other electrical equipment as is well understood in the industry may be used.

As the result of this operation, the welds 50 are formed at each side of the wheel, either simultaneously or separately. That is, the left hand flanges may be first welded to the hub tube 11 and then the other set may be welded while the spokes are held under the required tension. The tension applied to the spokes may be regulated in any desired manner, such as by controlling the fluid pressure admitted through the pipe 44 to the fluid pressure cylinder. Since each of the spokes was initially welded to the hub flanges and the rim while lying freely in position and not under tension, then the spokes are all of the same effective length. That is, the distances between the welds on each spoke are equal if the points of welding are concentric with the wheel axis as insured by the use of a suitable centering jig for holding the rim concentric with the hub flanges at the time of welding the spokes to the rim. Consequently, the tension applied by the hydraulic mechanism is distributed uniformly and so cannot warp or distort the wheel rim or move the hub out of its centralized location. Hence, by this procedure, a rigid or resilient wheel may be made without unnecessary strains and stresses in its construction.

It will now be appreciated that many modifications may be made in this wheel structure. For example, as shown in Fig. 8, the wheel rim may be formed by rolling a flat plate to form a concave annular arcuate plate 52 having its ends suitably connected together to form a continuous ring. Then a circular rod 53 is fitted inside of the wheel rim and welded in place by a suitable welding operation so that the weld 54 forms an integral structure of the two parts. This ring 53 of circular or other suitable cross section provides the proper point contact with the cylindrical surface of the wire rod 13 crossing it transversely, so that the weld joint 55 may be suitably formed, as above described.

The metal spokes may be secured to a rim of various other shapes as illustrated in Figs. 9 and 10. For example, a rim 56 shaped for an automobile wheel or other desired use may be initially rolled to provide the outside projecting annular bead 57 which gives the required point contact with the metal spoke 58. As shown in Fig. 9, the weld is formed on the outside of the rim. If desired, the spoke may be introduced through a hole 59 (Fig. 10) for welding to an inner surface bead 60 on the rim.

Similarly, the metal spokes may be secured to the hub in various ways. As shown in Fig. 9, each spoke 58 is welded to a projecting bead 62 on the inner face of a hub flange 63. In this construction, the cylindrical tube portion 64 of the flange is located outside of and telescoping with the central hub tube 65, and the hub weld connection 66 is between the cylindrical portions. In the construction of Fig. 11, the cylindrical part 64 of the hub flange 63 is located inside of the hub tube 65. Also, the spoke 58 is welded to a bead 62 on the inner face of the inwardly sloping flange 63. The spoke and flange plate are shown in their pre-welded positions for the sake of clarity of illustration.

Fig. 12 shows the same general construction in which the flange is shaped to provide a ball bearing raceway 68. Here the flange tube 64 telescopes over the outside of the hub tube 65, and the spoke is welded to a bead on the inner face of the flange. In the construction of Fig. 13 the spoke 58 is welded to a bead 69 formed on the outer side of the flange plate.

Fig. 14 shows a simplified form of flange in which the spoke 58 is welded to the rim edge 70 of a flange tube 71 that is provided with an outwardly flared portion 72 to give the necessary clearance. In this construction, the part 72 has such a short line of contact with the spoke 58 as to provide substantially a point contact for the projection welding, but if desired, the rim may be rounded to provide a true point contact.

Fig. 15 shows how a U-shaped or double spoke may be secured in place. The flange plate 75 mounted on the hub tube 76 is provided with an annular bead 77 corresponding with the bead structure of Figs. 10 to 13. The double spoke is welded at points 78 to this bead. Various other arrangements may be provided for welding a U-shaped double spoke to the hub flange. The outer ends of the spokes are secured to the rim as above described.

Fig. 16 shows a further construction in which the flange 80 has a number of slots 81 suitably cut therein. These slots may be located substantially radially and thus provide separate segments 82 to which the individual spokes 83 are welded by a raised bead connection. This aids in developing tension on the spokes and takes advantage of such resiliency as is present in the flange metal to relieve any unequal stresses in the wheel and to provide a structure which has adequate resiliency.

Figs. 17 and 18 show a still further type of structure in which the hub flange 85 is so shaped that the spokes 86 and 87 may cross each other without being bent. To this end, the hub flange plate is provided with spaced projecting beads 88 which are raised directly from the front face of the flange, and to which the spokes 86 are welded. The spokes 87, which lie beneath the spokes 86, are likewise welded to projection beads 89 raised from a depressed portion 90 previously stamped in the flange plate. That is, the flange is shaped in a stamping operation to provide depressed areas 90 extending in the general direction of the spoke 87 and the projection bead 89 is struck up from that depressed surface to bring it to the required level for the projection welding operation between the spoke 87 and the bead 89. Numerous other constructional features may be employed.

Many modifications may be made in this construction. As above indicated, the inner tubular ends of the hub flanges may be telescoping and then welded to each other without requiring the use of the intermediate hub tube. Also, the hub flanges may be disks or flat plates which are suitably connected to the central hub tube. Although this connection of at least one flange plate may be effected by stamping, punching or rolling projections or beads on the hub tube which prevent inward movement of the flange plate, it is preferred that the connections be made by a welding operation in order to form a rigid structure. It is also feasible to secure one end of each spoke to either the hub flange or the wheel rim by mechanical structures other than weld joints, but the welded structure above described is highly superior, in giving a rigidity and strength that is not obtainable by the use of mechanical devices which do not include permanently welded joints. A mechanical but not a rigid and integral connection may be formed, for example, by inserting the end of a spoke through a hole in the rim or a hub flange and riveting a head thereon, or by hooking one end of a spoke over a connection on the flange or rim. If such an expedient is adopted for one end of a spoke, it is desirable that the other end of each spoke be welded in place so as to provide needed rigidity. This, in particular, serves to provide equal effective spoke lengths and ultimately a uniform tension.

It will therefore be appreciated that a primary feature of my invention involves providing a wheel in which all of the spokes are of equal effective lengths and are held under an equalized tension, and wherein that tension is obtained as above described by initially securing, and preferably welding, the sides of the spokes axially of the wheel to both the rim and two axially movable hub flanges, and then pulling the flanges apart to tension the spokes and welding the hub parts together to hold the spokes thus tensioned. It is therefore to be understood that the above disclosure of various embodiments of this invention and of the preferred method of making the wheel is to be interpreted as setting forth the principles of the invention and its preferred practices and not as imposing limitations on the appended claims.

I claim:

1. A vehicle wheel comprising an annular metal rim having axially disposed weld projections, a set of straight spokes having their side walls individually projection welded to and interfused with the rim projections at points spaced from the ends of the spokes, two spaced hub flanges having weld projections, the side walls of the spokes being projection welded to and interfused with projections on said flanges at points spaced from the ends of the spokes in an alternate arrangement, and a cylindrical hub integrally welded to said flanges and holding them spaced apart at distances which apply longitudinal tension to all of the spokes simultaneously.

2. A vehicle wheel comprising in combination a metallic rim having circumferentially disposed welding projections directed axially of the rim on either side of the median plane thereof, a hub comprising a pair of axially spaced flanges, each having a circumferentially disposed welding projection directed axially of said wheel, and a plurality of straight lengths of metallic rod welded on the side walls of their end portions to the welding projections of said rim and flanges to form the spokes of the wheel, the arrangement being such that said spoke-forming rod lengths may be welded to said projections by means of a resistance welding die movable in a direction normal to said plane.

3. A vehicle wheel comprising a metal strip curved transversely and bent into ring form to provide a tire mount, a ring formed of metallic round rod stock secured in central relation in said tire mount, and metallic spoke-forming rods welded to said ring in crossed relation therewith.

VERNOR WAYNE GREEN.

REFERENCES CITED

The following references are of record in the file of this patent:

UNITED STATES PATENTS

| Number | Name | Date |
|---|---|---|
| 380,358 | Smith et al. | Apr. 3, 1888 |
| 474,897 | Barnes | May 17, 1892 |
| 607,201 | Waggoner | July 12, 1898 |
| 818,175 | Howe et al. | Apr. 17, 1906 |
| 917,461 | Lachman | Apr. 6, 1909 |
| 1,432,191 | Lachman | Oct. 17, 1922 |
| 1,467,478 | Hayes | Sept. 11, 1923 |
| 1,515,153 | Dittmar | Nov. 11, 1924 |
| 1,634,700 | Williams | July 5, 1927 |
| 1,787,822 | Heider | Jan. 6, 1931 |
| 1,949,695 | Shoemaker | Mar. 6, 1934 |
| 2,062,841 | Stefancky | Dec. 1, 1936 |
| 2,170,666 | Sinclair | Aug. 22, 1939 |